METHOD OF AND APPARATUS FOR SOUND EQUALIZATION IN DICTATING MACHINES

Filed Feb. 26, 1945 2 Sheets-Sheet 1

3000 CYCLES, TRACK SPEED 40' PER-MIN.

3000 CYCLES, 10' PER-MIN.

3000 CYCLES, 20' PER-MIN.

2500 CYCLES, 20' PER-MIN.

300 CYCLES, 40' PER-MIN.

3000 CYCLES, 40' PER-MIN.

COMBINATION OF FIG. 6a & 6b
DOUBLE ENERGY

INVENTORS
Robert L. Stone
and Arthur Leonard Anderson
BY
H. G. Manning
Attorney

INVENTORS
Robert L. Stone
and Arthur Leonard Anderson
BY
H. G. Manning
Attorney

Patented Oct. 31, 1950 2,528,457

UNITED STATES PATENT OFFICE 2,528,457

METHOD OF AND APPARATUS FOR SOUND EQUALIZATION IN DICTATING MACHINES

Robert L. Stone, Guilford, and Arthur Leonard Anderson, New Haven, Conn., assignors to The Soundscriber Corporation, New Haven, Conn., a corporation of Connecticut Application February 26, 1945, Serial No. 579,716

3 Claims. (Cl. 179—100.4)

This invention relates to sound recording and reproducing apparatuses, and more particularly to a dictating machine employing a disk record driven at constant angular velocity designed to extend the volume range of said record.

One object of this invention is to provide a dictating machine of the above nature which will afford essentially constant listening volume and quality of reproduction at all diameters of the record groove.

Another object is to provide a dictating machine of the above nature in which the record will be reproduced with the minimum amount of surface noise or scratch.

A further object is to provide a dictating machine of the above nature in which the reproduction response will be automatically and progressively compensated as the playback stylus moves inwardly across the record.

A further object is to provide a dictating machine of the above nature in which speech sounds will be so recorded that the energy content in the undulations of the record grooves throughout the record will be maintained at the maximum amount permitted by the limitations imposed by the groove speed, frequency range, and groove spacing, whereby the reproduction from said record will have the maximum possible signal-to-surface noise ratio.

A further object is to provide a phonograph of the above nature in which such compensation may be accomplished without imposing frictional or other drag-producing forces on the playback head or arm.

A further object is to provide a recording and reproducing machine of the above nature, in which the sound waves are recorded on a record driven at low speed, of the type disclosed in Reissue Patent No. 22,183, of September 22, 1942, to Lincoln Thompson, entitled "Apparatus for Recording Sound on Thin Disks," based on his original Patent No. 2,200,866, granted May 14, 1940.

A still further object is to provide a dictating machine of the above nature which will be simple in construction, inexpensive to manufacture, easy to install and manipulate, compact, ornamental in appearance, and very efficient and durable in use.

With these and other objects in view, there have been illustrated on the accompanying drawings several forms in which the invention may conveniently be embodied in practice.

Figure 6:
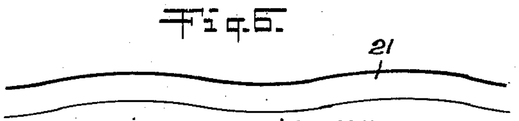
Fig. 6 is a similar diagram of a sound groove recorded at normal amplitude at the much lower frequency of 300 cycles and at the higher speed of 40 feet per minute, which will also result in a satisfactory reproduction.
Figure 6A:

Fig. 6*a* is a similar diagram of a satisfactory sound groove recorded at 3,000 cycles at the same speed of 40 feet per minute, with only one-tenth the amplitude of the groove shown in Fig. 6, and yet having substantially the same energy content.

Figure 6B:
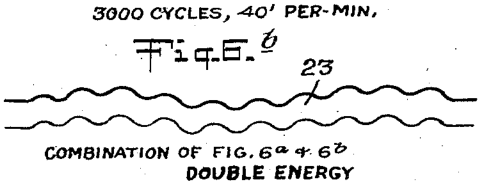

Fig. 6*b* is a similar diagram of a satisfactory sound groove produced by combining Fig. 6 and Fig. 6*a*—it being noted that the energy stored in the combined groove of Fig. 6*b* is substantially double that in either of the grooves illustrated in Fig. 6 or Fig. 6*a*.

Figure 7:
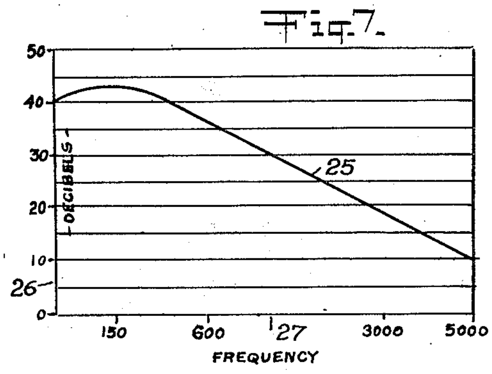

Fig. 7 is a chart indicating graphically the distribution of energy in normal average recorded speech.

Figure 8:
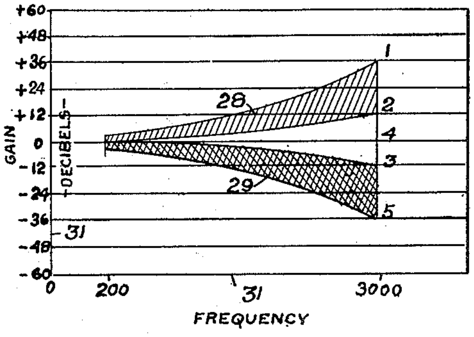
Figure 8A:
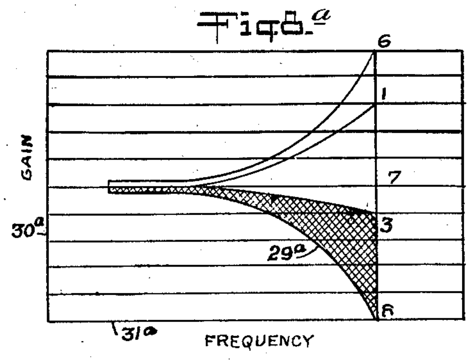

Figs. 8 and 8*a* are charts indicating graphically the reduction in surface noise in the record obtained by the use of the present invention.

Figure 9:
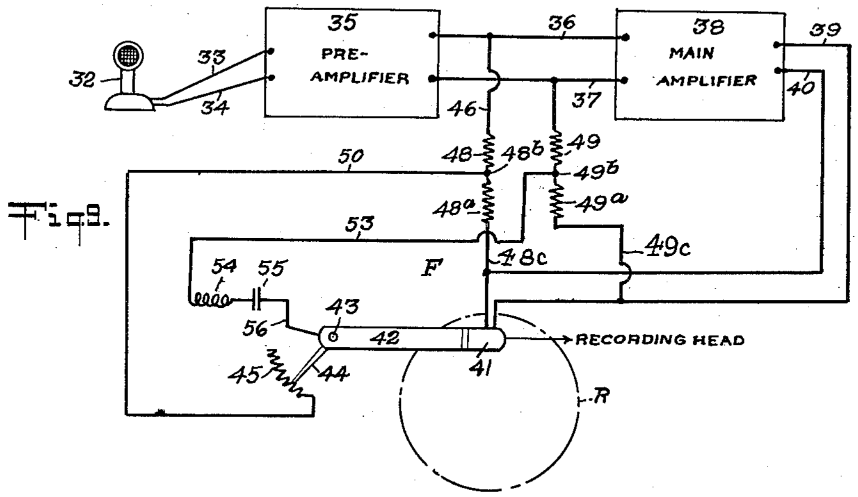

Fig. 9 is a circuit diagram of a recording apparatus designed for use with the present invention.

Figure 10:
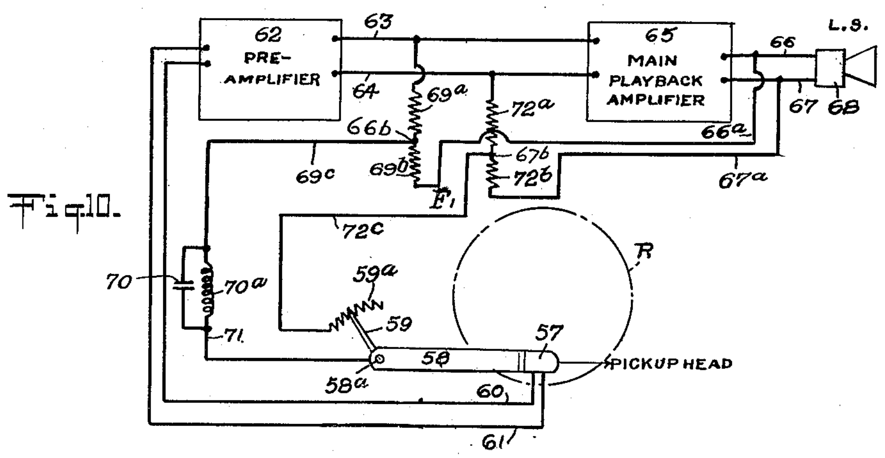

Fig. 10 is a circuit diagram of an equalizing playback apparatus adapted to be employed for reproducing records recorded by the apparatus shown in Fig. 9.

Figure 11:
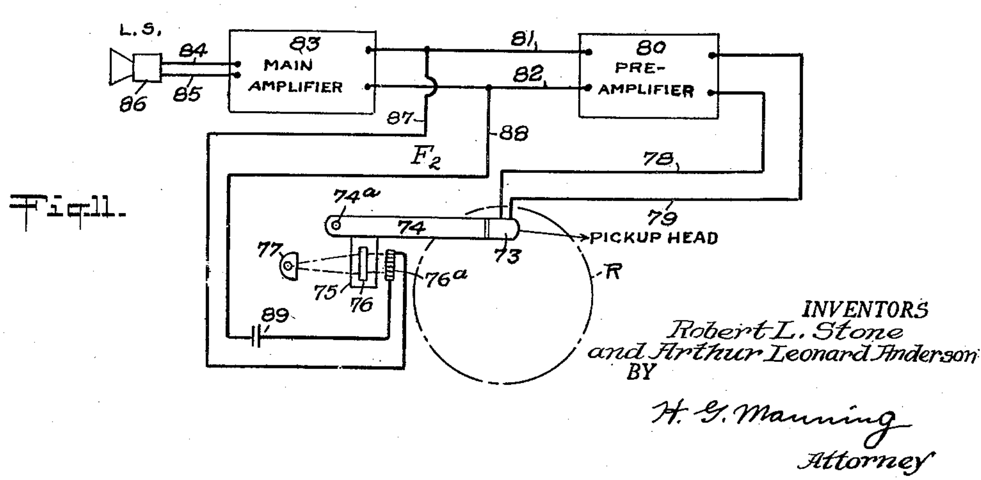

Fig. 11 is a similar diagram of a modified form of playback apparatus, also embodying the invention, and employing a photo-electric cell to control the selective frequency response.

In recording on disk records driven at constant angular velocity, it is well known that the crowding together of the recorded sound undulations in the groove at the inner portions of the record results in serious losses in reproduction, which are more marked the higher the frequency of the sound waves and the slower the speed of the record.

Attempts have been made in the past to compensate for the loss of the higher frequency components of the sounds being recorded by selectively increasing the amplitude of such components. It has been found, however, that the slower groove speeds at the center of the record restrict the amount of pre-emphasis which can be selectively placed upon the high frequency wave components at this part of the record. This has been clearly illustrated in Figs. 2 to 5 of the drawing, from which it will be obvious that for any given groove diameter, size of stylus, and speed of recording, there is a definite higher limit to the amplitude of the pre-emphasized high frequency components of the sound waves which may be used without producing distorted scalloping and widening effects upon the grooves.

If these limits are exceeded, the reproduction response will be of poor quality and fidelity due to a partial or complete erasure of the groove undulations and the fact that the playback stylus will not fit into the individual undulations but will "bridge" over adjacent undulations.

Two different systems of employing the recording and reproducing apparatus, diagrammatically shown in Figs. 9 and 10, may be used in accordance with the present invention.

In the first system, as indicated in Fig. 8, the high frequencies are accentuated to the same degree at all diameters of the groove during recording, which accentuation will be the maximum permitted by the lowest groove speed at the center of the record.

In the second system, shown in Fig. 8*a*, the high frequency waves will be accentuated variably to the maximum amplitude of waves permitted at all parts of the record by the limitations of the grooves.

Specifically, in the second system of the present invention herein disclosed, the high frequency components of the sound waves are accentuated during recording at a progressively decreasing rate as the stylus moves from the outside toward the center of the record within the limits and restrictions mentioned above.

The present invention also contemplates the provision of playback apparatus which, when the records are reproduced, will progressively compensate for the accentuated higher frequency components, taking into account the groove losses in such a manner as to produce a constant overall result. By the use of this system the recorded undulations of the record groove will deliver to the pickup stylus the maximum possible energy. When the record is reproduced, the resulting sounds will have greatly diminished surface noise.

Furthermore, since the surface noise or "scratch" is more pronounced in the higher frequencies, additional reduction in surface noise will result from the fact that at all diameters of the record groove the higher frequency components of speech are greatly accentuated during recording, which permits reproduction with attenuated high frequency response thereby reducing the apparent surface noise.

During the playback of the records produced by both systems, the reproduction response will be progressively compensated to provide a uniform or constant overall response throughout the record.

Figure 1:
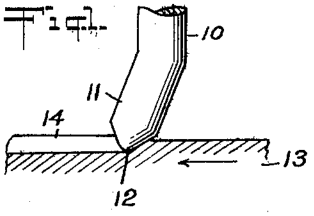
Fig. 1 shows a standard form of recording stylus for embossed and indented recording, having a spherical diamond point.

Referring now to the drawings in which like reference numerals denote corresponding parts throughout the several views, the numeral 10 indicates a stylus having its lower end 11 inclined at 70 degrees to the record 13, and being provided with a spherically-tipped conical diamond point 12. As clearly shown in Fig. 1, the stylus 10 causes the surface of the record 13 to be embossed and indented to produce a spiral groove 14 therein.

Figure 2:
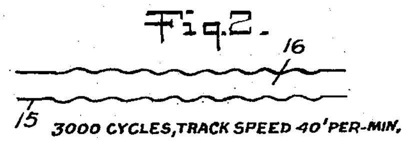
Fig. 2 illustrates a diagram of an embossed groove produced by the recording stylus shown in Fig. 1, in which the first portion of said groove is unmodulated and is followed by a portion having uniform lateral undulations of normal amplitude.

Fig. 2 shows an enlarged plan view of a record groove produced by the stylus 10 at a track speed of 40 feet per minute, the first portion 15 of the groove being unmodulated, and followed by a section 16 modulated at 3,000 cycles per second.

Figure 3:
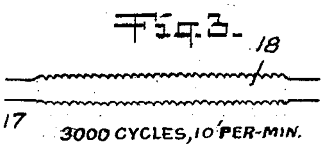
Fig. 3 is a similar diagram of a record groove illustrating the pronounced widening and scalloped effect produced by a slow-speed stylus which will result in a distorted and deteriorated reproduction.

Fig. 3 shows a similar record groove produced at a track speed of 10 feet per minute, the first portion 17 thereof being unmodulated and followed by a portion 18 having small scalloped undulations recorded with the same amplitude at the same 3,000 cycles frequency. In this recording, the stylus has merely widened the groove without registering any appreciable undulations capable of reproduction. A loss in reproduction will result from the "erased" undulations and the widened groove into which the reproducing stylus no longer fits.

Figure 4:
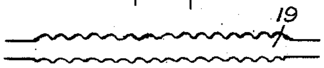
Fig. 4 is a similar diagram of a groove recorded at 3,000 cycles but at an intermediate groove speed of 20 feet per minute, and showing only a slight scalloped and widened effect.

Fig. 4 shows a similar groove 19 recorded at 3,000 cycles and 20 feet per minute, with only a slightly widened scalloped section 19 and causing a lesser distortion.

Figure 5:
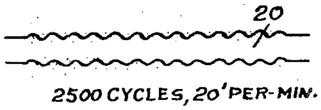
Fig. 5 is a similar diagram of a sound groove recorded at the same intermediate speed of 20 feet per minute, but with a somewhat lower frequency of 2,500 cycles.

In the groove 20 shown in Fig. 5, the recording was made at 2,500 cycles and at a speed of 20 feet per minute, thus producing a properly undulated groove which will permit satisfactory reproduction, and showing that with decreased frequency the distorting effects will be lessened and low groove speeds may be utilized.

In the groove 21, shown in Fig. 6 a satisfactory recording was made at normal amplitude at the much lower frequency of 300 cycles and a higher track speed of 40 feet per minute.

In Fig. 6*a* another 3,000 cycle sound groove 22 was made by recording at the same speed as in Fig. 6, but with only one-tenth the amplitude, and yet with the same energy content as in the groove 21 illustrated in Fig. 6. Both of the grooves shown in Figs. 6 and 6*a* will reproduce in a satisfactory manner with the same voltage generated from either a magnetic or a dynamic pickup.

Fig. 6*b* shows another satisfactory recorded groove 23 which is produced by a combination of the two waves represented in Figs. 6 and 6*a*, and indicates a combined wave with double the energy of either of said grooves 21, 22, despite the fact that the overall increase in ampiltude is only about 10%.

Thus it will be seen that when the 3,000 cycle curve of Fig. 6*a* is superimposed on the 300 cycle curve of Fig. 6, the resultant composite wave (Fig. 6*b*) has only about 10% greater amplitude at any one point, but actually has double the energy content.

In the chart shown in Fig. 7, the curve 25 indicates the energy content of average speech sounds at various frequencies, the ordinates 26 and abscissae 27 of said chart being graduated in decibels of gain, and frequency, respectively. This chart shows clearly that in the sounds of average speech the major portion of the energy exists in the low frequency components; consequently, a high degree of accentuation of the high frequency components is permissible in order to cause all frequencies of the sound to reach the same energy level.

It will be noted from Fig. 7 that the average speech power at 3,000 cycles a second is about twenty decibels below that at the 150–600 cycles maximum portion of the curve. In other words, in order to bring the energy level of a 3,000-cycle component of speech to that of the energy level of the 150–600 cycle range, an accentuation of about twenty decibels will be required and, as shown in Fig. 6*b*, may be imposed upon the sound track without distortion of the wave form.

The charts shown in Fig. 8 and Fig. 8*a* illustrate graphically the improved results obtained by the present invention.

Thus, in Fig. 8, the curves 1, 2 indicate the recording response at the inside and outside of the record, respectively, obtainable by the prior system disclosed in the Kleber et al. patent, No. 2,239,042, of April 22, 1941, entitled "Wave Recording and Reproducing." Curve 3 indicates the response at both the inside and outside of the record used during playback, according to this prior system, to produce a flat overall result with respect to the axis 4. This curve also shows that at the outside grooves of the record there will be practically no loss in the high frequency components.

Curve 1 of Fig. 8 also denotes the recording response which would be employed, according to the first system of the present invention, at all groove diameters—the entire record being recorded with an accentuation of high frequencies, which is the maximum permitted by the lowest groove speed.

The chart shown in Fig. 8*a* indicates the results obtained with the second system of the present invention where the high frequencies are accentuated variably to the maximum amplitudes permitted by the limitations of the grooves at all points of the record.

The curve 1 of Fig. 8*a* represents the recorded frequency response at the inside of the record, while the curve 6 represents the much greater accentuation employed at the outside of the record.

The reproduction responses for the inside and outside of the record during playback are indicated by the curves 3 and 8, respectively, producing a flat overall result in both cases with respect to the line 7.

It will be understood that less attenuation is required during playback at the lower speeds at the inside of the record due to the higher groove losses, and the fact that the accentuation imposed during recording the higher frequencies is less than at the outside of the record.

The shaded areas 29, 29*a* indicate the reduction in surface noise at the outside of the record achieved by the two systems of recording and reproducing illustrated in Figs. 8 and 8*a*, respectively, as compared with the system used in the above-mentioned Kleber et al. patent. The area 29 is bounded by the curves 3, 5, of Fig. 8, while the area 29*a* is bounded by the curves 3, 8 of Fig. 8*a*.

In the use of the present invention, since the surface noise or "scratch" is more predominant in the high frequency range of the sound waves, the actual improvement in reproduction obtained by both systems is quite striking.

Moreover, while the decrease in surface noise is more marked at the outside grooves of the record, its utmost in quality is obtained at all points thereof, even though the improvement at the inside portions will not be so outstanding.

The specific circuit employed in the present invention for variably accentuating the high frequencies during recording may be either of the type used in the above-mentioned patent to Kleber et al., or in the patent to Lincoln Thompson, No. 2,369,088, February 6, 1945, entitled "Variable Resistance Equalizer."

*Recording apparatus*

In the recording apparatus shown in Fig. 9, the sounds received in the microphone 32 are led through conductors 33, 34 to a preamplifier 35, the output of which passes by conductors 36, 37 to the main amplifier 38. The conductors 39, 40 carry the output of the main amplifier 38 to a recording head 41 mounted upon the end of a recording arm 42, which is driven by a feed mechanism (not shown) from the outside to the inside of the record R. The recording arm 42 is mounted on a pivot bearing 43, and said arm carries an inclined movable contact arm 44 which engages an arcuate resistance 45 located in a conventional feed-back equalizer circuit F tuned to resonance at the high frequencies for which accentuation is desired.

The conductor 36 is connected by a conductor 46 to an isolating resistance 48 which is connected by a junction 48*b* to a second isolating resistance 48*a*. Similarly, the conductor 37 is connected to a third isolating resistance 49 joined at its other end by a junction 49*b* to a fourth isolating resistance 49*a*. The resistance 48*a* is connected by a conductor 48*c* to a wire 40 leading to one side of the main amplifier output, and the resistance 49*a* is connected by a wire 49*c* to the wire 39 leading to the other side of said output. The junction 48*b* is connected by a wire 50 to the arcuate resistance 45. The junction 49*b* is connected by a conductor 53 to an inductance 54, which in turn is joined to a condenser 55, the latter being electrically connected by a conductor 56 to the pivot bearing 43 of the recording arm 42. The inductance 54 and the condenser 55 comprise a series-tuned circuit.

It will be understood that when the arm 42 is at the inside of the record all the resistance 45 will be included in the feed-back circuit so that the feed-back loop will not be bypassed materially; hence, practically complete feed-back will result. Under these conditions little or no equalization will take place, and a decreased amplifier gain of the high frequencies will result. At the outside grooves of the record, however, the resistance 45 will be considerably reduced so that the feed-back loop will be bypassed and almost shunted out at the resonant frequency, and the maximum equalization or high frequency accentuation will take place.

*Reproducing apparatus*

Referring now to Fig. 10 of the drawing, the playback apparatus comprises a pickup head 57 which is flexibly mounted upon the end of a pickup arm 58 adapted to swing upon a vertical shaft 58*a* and fed positively across the record by suitable feed mechanism (not shown herein), such as was disclosed in Patent No. 2,357,033, issued to Lincoln Thompson August 29, 1944, entitled "Pickup Feed Mechanism for Phonographs." The pickup arm 58 carries upon its rear end a laterally-extending movable contact 59 adapted to engage an arcuate resistor 59*a*.

The pickup head 57 is connected to a preamplifier 62 by a pair of conductors 60, 61, and said preamplifier 62 is connected by a pair of conductors 63, 64 to a main playback amplifier 65 having output terminals 66, 67 leading to a loudspeaker 68. A pair of conductors 66*a*, 67*a* connect the main amplifier output terminals 66, 67 to a pair of isolating resistors 69*b*, 72*b*, respectively.

A conductor 69*c* connects a junction 66*b* between the isolating contact 69*b* and a similar isolating contact 69a to a parallel-tuned circuit comprising a condenser 70 and an inductance 70a, which tuned circuit is joined by a wire 71 to the pivot shaft 58a of the pickup arm 58. The reproducing tuned circuit is preferably tuned to the same frequency as the recording tuned circuit shown in Fig. 9.

The arcuate resistance 59a is connected by a conductor 72c to a junction 67b between the isolating resistor 72a and a similar isolating resistor 72b which is connected to the conductor 64. The conductor 69c, the tuned circuit (70, 70a), the conductor 71, the contact arm 59, the arcuate resistance 59a, and the conductor 72c constitute a bypass on the feedback circuit loop $F_1$ of the main playback amplifier 65, and said bypass acts to accentuate the high frequencies to a degree determined by the amount of the effective resistance 59a.

*Operation of playback*

In operation, the playback apparatus shown in Fig. 10 should be so adjusted that the feed-back bypass circuit will be practically inoperative at the outside of the record, but as the recording arm moves inwardly, the resistance in the feed-back bypass circuit will decrease, thus reducing the feed-back and increasing the amplifier gain at the higher frequencies.

The diagram in Fig. 11 shows a simplified playback circuit in which the numeral 73 indicates a playback head which is flexibly mounted on the end of a playback arm 74 freely pivoted in a conventional manner with the minimum of friction on a shaft 74a, but not being fed positively as is the playback arm of Fig. 10. The playback arm 74 has a side arm 75 upon which is mounted a window shield 76, which causes light from a fixed lamp 77 to impinge to a varying degree, as the pickup arm is swung inwardly across the record R, upon a photo-electric cell 76a mounted on the cabinet of the machine. The photo-electric cell 76a is connected in series with a condenser 89 for shunting the high frequencies to a degree determined by the resistance of the cell.

The playback head 73 is connected by a pair of conductors 78, 79 to a preamplifier 80, which in turn is joined by a pair of conductors 81, 82 to a main amplifier 83 having conductors 84, 85 leading to a loudspeaker 86. The conductors 81, 82 are joined to a shunt circuit $F_2$ including conductors 87, 88, the photo-electric cell 76a, and the condenser 89. The use of the photo-electric cell avoids the imposition of frictional retarding forces upon the pickup arm.

It will be understood that if desired, the photo-electric cell 76a of Fig. 11 may be employed in place of the arcuate resistance 59a in the circuit shown in Fig. 10.

While there have been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a sound reproducing apparatus, means to play back a disk sound record having a continuous groove selectively accentuated for the sound waves of the higher frequencies at all diameters of said groove, to the maximum amount permitted by the lowest groove speeds, a playback arm operating at constant angular speed and having a reproducing stylus resting in said recorded groove, means operatively connected with said stylus to selectively attenuate the amplitudes of the higher frequency components of the recorded sound waves during reproduction, at all groove diameters, in order to maintain a uniform overall recorder-reproducer response and increase the signal-to-surface noise ratio, said means including an electron tube amplifier circuit and a feedback loop in shunt with said circuit a variable resistance connected with said loop, and means responsive to the movement of the playback arm to vary said resistance including a window carried by the playback arm, a fixed source of illumination impinging on said window, a fixed photoelectric cell, and means responsive to the movement of said playback arm to cause a progressively varying amount of light to pass through said window and impinge upon said cell as the playback arm swings across said record.

2. The method of recording and reproducing sound waves using a disk record rotating at a constant angular speed, comprising the steps of recording said sound waves in a spiral groove on said record while continuously, progressively, selectively, and increasingly accentuating the amplitudes of the higher frequency waves throughout the length of said groove in the direction of lower groove speeds, and subsequently reproducing said record at the same angular speed at which it was recorded, while continuously, selectively, and progressively attenuating the amplitudes of the higher frequency components to produce a uniform overall recorder-reproducer response and increased signal-to-surface noise ratio.

3. The method of recording and reproducing sound waves using a disk record rotating at a constant angular speed, comprising the steps of recording the sound waves in a spiral groove while continuously and progressively accentuating the sound waves of the higher frequencies throughout the length of the groove to the maximum amount permitted by the innermost groove speeds, and subsequently reproducing said record while rotating it at the same constant angular speed at which it was recorded while continuously and progressively attenuating the amplitudes of the higher frequency components of the recorded sound waves, to maintain a uniform overall recorder-reproducer response and increased signal-to-surface noise ratio.

ROBERT L. STONE.
ARTHUR LEONARD ANDERSON.

REFERENCES CITED

The following references are of record in the file of this patent:

UNITED STATES PATENTS

| Number | Name | Date |
|---|---|---|
| 1,940,282 | Wolfe | Dec. 19, 1933 |
| 2,118,602 | Goldsmith | May 24, 1938 |
| 2,220,141 | Beers | Nov. 5, 1940 |
| 2,239,042 | Kleber | Apr. 22, 1941 |
| 2,247,924 | Saliba | July 1, 1941 |
| 2,320,429 | Hasbrouck | June 1, 1943 |
| 2,369,088 | Thompson | Feb. 6, 1945 |